No. 815,341. PATENTED MAR. 20, 1906.
A. FLEEGER.
COMBINED BELT TIGHTENER AND FASTENER.
APPLICATION FILED OCT. 21, 1905.
2 SHEETS—SHEET 1.
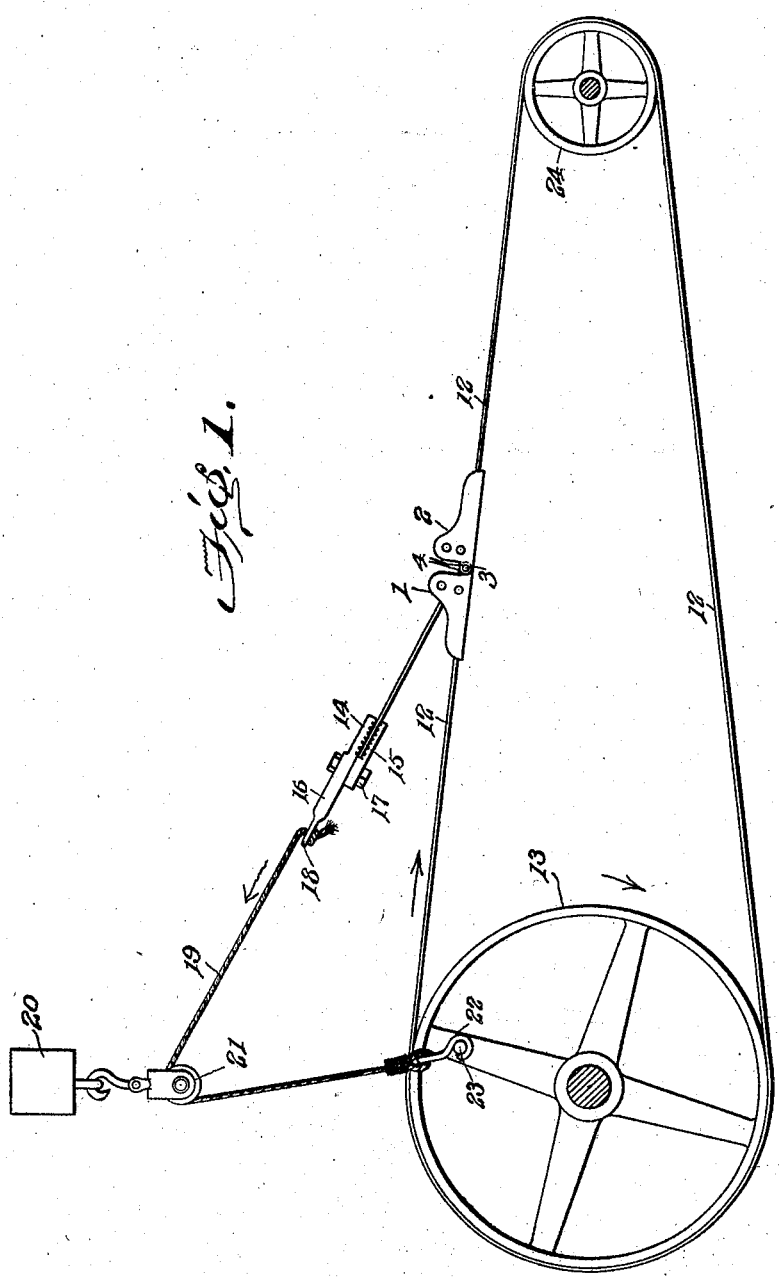
Witnesses
G. Howard Walmsley,
Irvine Miller.
Inventor
Austin Fleeger,
By _____,
Attorney No. 815,341. PATENTED MAR. 20, 1906.
A. FLEEGER.
COMBINED BELT TIGHTENER AND FASTENER.
APPLICATION FILED OCT. 21, 1905.
2 SHEETS—SHEET 2.
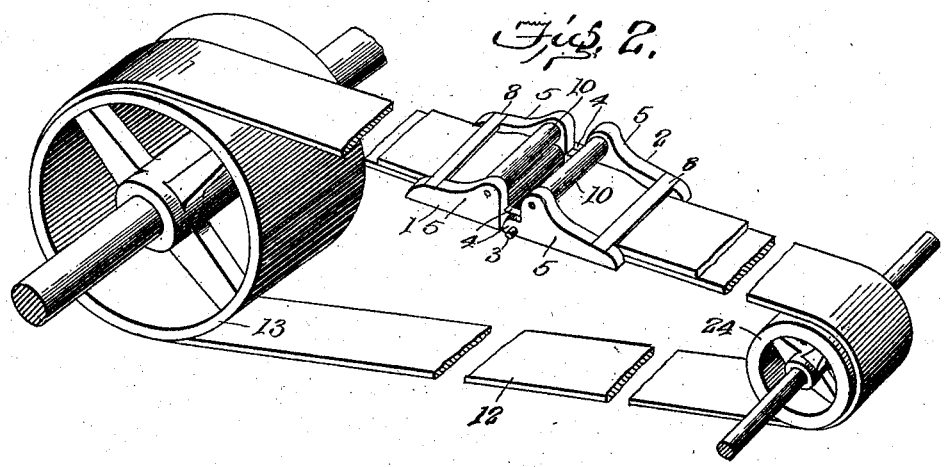
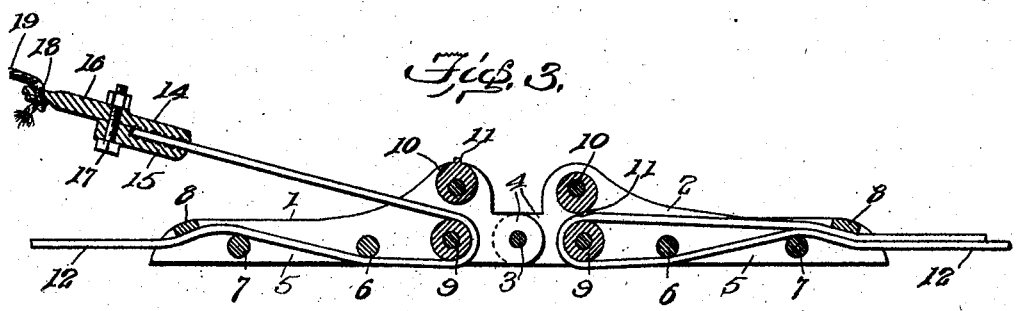
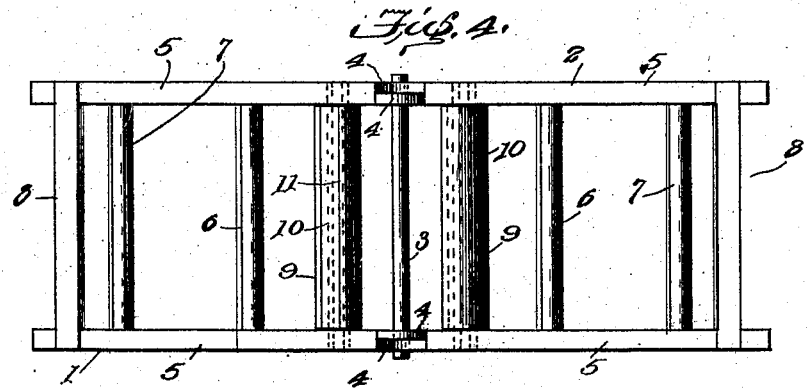
Witnesses
G. Howard Walmsley,
Irvine Miller.
Inventor
Austin Fleeger,
By H. A. Toutuino.
Attorney

UNITED STATES PATENT OFFICE.

AUSTIN FLEEGER, OF CHICORA, PENNSYLVANIA.

COMBINED BELT TIGHTENER AND FASTENER.

No. 815,341.  Specification of Letters Patent.  Patented March 20, 1906.

Application filed October 21, 1905. Serial No. 283,752.

*To all whom it may concern:*

Be it known that I, AUSTIN FLEEGER, a citizen of the United States, residing at Chicora, in the county of Butler and State of Pennsylvania, have invented certain new and useful Improvements in a Combined Belt Tightener and Fastener, of which the following is a specification, reference being had therein to the accompanying drawings.

This invention relates to combined belt tighteners and fasteners, and has for its object to produce a structure capable of combining these two functions in such a way that it may be readily used for the purpose of tightening or taking up the slack of the belt when necessary, serving also as a fastener for connecting the ends of the belt when the belt is in use.

The device is primarily intended for use in connection with the very large and heavy belts employed in the oil regions, which are sometimes twelve inches in width and ninety feet in length. These belts stretch in use, so that it becomes necessary to frequently stop the engine, disconnect the belt, cut out a piece estimated to restore the belt to the proper length, and then again fasten the ends of the belt and replace the belt. This operation requires two or three people and several hours' time and is difficult to properly carry out. The construction which I have devised enables a single operator to tighten the belt to the exact degree required in a very few minutes.

To these ends my invention consists in certain novel features which I will now proceed to describe and will then particularly point out in the claims.

In the accompanying drawings, Figure 1 is a side elevation of a structure having my improved tightener and fastener applied thereto in one form, the same being shown during the operation of tightening or removing the slack from the belt. Fig. 2 is a perspective view showing the same structure with the device applied thereto and used as a fastener to connect the ends of the belt when in use. Fig. 3 is a central longitudinal sectional view taken in a vertical plane through the device and its connections, as shown in Fig. 1, the parts being shown on an enlarged scale; and Fig. 4 is a plan view of the fastener proper or coupling detached.

Referring to said drawings, I have illustrated a coupling (shown separately in Fig. 4) which connects the ends of the belt when in use, this connection being illustrated in Fig. 2. This coupling comprises two members 1 and 2, connected by a transverse pivot 3 and pivot-lugs 4 so as to have a hinged relation to each other to permit them to readily adapt themselves to the curvature of the pulleys in passing around these latter. Each of these members consists of a suitable frame (shown in the present instance as comprising side pieces 5 and cross-bars 6, 7, and 8.) The cross-bars 6 and 7 are preferably round in cross-section, while the cross-bars 8 are preferably flat and located immediately adjacent to the cross-bars 7. Each member is provided at its inner end with a cross-piece 9, forming a guide around which the belt passes, the same being preferably in the form of a roller mounted to rotate in the side pieces 5 of the frame. Above each roller 9 there is located an eccentrically-mounted roller 10, the portion whereof which has the maximum eccentricity being provided, if desired, with a tooth 11 or being otherwise roughened to give it a better grip. The ends of the belt are connected to this fastener in the manner indicated in Fig. 2 and at the right hand of Fig. 3. The belt is indicated by the reference-numeral 12, and its two ends are respectively connected to the two members 1 and 2 by passing said ends under the cross-bar 8, over the cross-bar 7, under the cross-bar 6, around the guide or pulley 9, and then back between the cross-bars 7 and 8 above the lap of the belt already in place there. The friction of the belt against the cross-pieces and of the two parts of the belt against each other, particularly between the cross-bars 7 and 8, tends to keep the belt from slipping through the fastener, but the ends are positively held by so turning the eccentric rollers as to cause them to grip the belt against the guides 9, the arrangement being such that the stronger the pull upon the belt the more firm is the grip of the rollers. When thus employed as a fastener, it will be seen that the belt is held without requiring the cutting or punching of any holes therethrough and that the belt need not be of any exact length, since the ends thereof may be passed around or tucked through the cross-bars and may extend beyond the same.

Referring now to the use of the device as a belt-tightener, assuming that the belt, arranged as shown in Fig. 2, has become slack, the following procedure is had to remove the slack: The end of the belt in one of the members—say, for instance, the member 1, which lies nearest the driving-pulley or band-wheel 13—is withdrawn from under the cross-bar 8 and is gripped between the jaws 14 and 15 of a clamp 16. In the present instance I have shown this clamp as so constructed that the jaw 14 is in one piece with the body of the clamp, while the jaw 15 is drawn against it to grip the belt by means of a screw or bolt 17. The clamp 16 has an eye 18 or is otherwise so constructed as to permit its ready connection with a rope or cable 19, preferably a wire rope. 20 indicates an elevated support, preferably one of the roof-beams of the belt-house, from which there is suspended a pulley 21. The rope or cable 19 passes over this pulley and is thence carried downward to the driving-pulley or band-wheel 13, its lower end being provided with a hook 22 or other suitable means, by which it may be readily engaged with an eccentric-pin 23 on the side of said driving-pulley. The driven pulley is indicated at 24. The parts being thus connected, the gripping-roller 10 is so turned as to release the belt in the member 1, whereupon the engine is "turned over" or caused to rotate slowly. This will rotate the driving-pulley 13 in the direction indicated by the arrow and will cause the rope 19 to exert a pull upon the belt in the direction indicated by the arrows lying adjacent to said belt. This pull tightens the belt, removing the slack, and is continued until the belt has reached the desired tension, whereupon the engine is stopped and the gripping-roller of the member 1 is turned down, so as to grip the belt and prevent it from slipping back. The ends of the rope 19 are then disconnected from the belt and pin 23, respectively, the portion of the end of the belt pulled through the tightener is tucked down between the bars 7 and 8, and the belt is again ready for use.

It will be seen that the operation of tightening the belt can be performed in a very brief period of time and by a single operator. This latter feature is of importance where, as is frequently the case, a single operator is employed during the night-time and the belt accidentally slips off or becomes too slack for use. Ordinarily in such a case the plant remains idle during the rest of the night until help can be obtained. The construction which I have described, however, enables the operator to at once either tighten or replace the belt unaided. It will be further observed that when the fastener is once in place it need not be removed from the belt, but may remain in position thereon indefinitely or until a new belt is required, acting as a fastener for the ends when the belt is at work and as a means for aiding in the removing of slack when such removal is necessary. A still further advantage is that no cutting of the belt is required, as with the usual construction, where the two ends of the belt are united at their extremities and any surplus must be cut away. Usually this tightening and cutting operation occurs at frequent intervals, and the portions cut from the ends of the belt are so small as to be practically useless. With my improved construction no cutting is necessary, and each portion of slack gained adds to the size of the end drawn out by the tightening mechanism, so that eventually the surplus of belting at this end is of a size such as to have some commercial value in case it is desired to remove it.

I do not wish to be understood as limiting myself to the precise details of construction hereinbefore described, and shown in the accompanying drawings, as it is obvious that these details may be varied without departing from the principle of my invention.

Having thus fully described my invention, what I claim as new, and desire to secure by Letters Patent, is—

1. Driving and driven pulleys, a belt, and a coupling connecting the ends of the belt and forming a belt-fastener which unites said ends when the belt is in use, said coupling being provided with a guide and means for holding and releasing said ends, in combination with a rope or other flexible connection, a guiding-pulley around which said rope passes, and means for connecting one end of said rope to the driving-pulley and the other end of said rope to the adjacent end of the belt, the belt end thus connected passing around the guide on the coupling, substantially as described.

2. Driving and driven pulleys, a belt, and a coupling connecting the ends of the belt and forming a belt-fastener which unites said ends when the belt is in use, said coupling being provided with guides around which the belt ends pass, and with eccentric gripping-rollers coöperating with said guides, in combination with a rope or other flexible connection, a guiding-pulley around which said rope passes, and means for connecting one end of said rope to the driving-pulley and the other end of said rope to the adjacent end of the belt, substantially as described.

3. Driving and driven pulleys, a belt, and a coupling connecting the ends of the belt and forming a belt-fastener which unites said ends when the belt is in use, said coupling being provided with guide-rollers around which the belt ends pass, and with coöperating eccentric gripping-rollers, in combination with a rope or other flexible connection, a guiding-pulley around which said rope passes, and means for connecting one end of said rope to the driving-pulley and the other end of said rope to the adjacent end of the belt, substantially as described.

4. Driving and driven pulleys, a belt, and a coupling connecting the ends of the belt and forming a belt-fastener which unites said ends when the belt is in use, said coupling comprising two hinged members, each having a guide around which the corresponding belt end passes, and means for gripping said belt end, in combination with a rope or other flexible connection, a guiding-pulley around which said rope passes, and means for connecting one end of said rope to the driving-pulley and the other end of said rope to the adjacent end of the belt, substantially as described.

5. Driving and driven pulleys, a belt, and a coupling connecting the ends of the belt and forming a belt-fastener which unites said ends when the belt is in use, said coupling comprising two hinged members, each provided with a guide-roller around which the corresponding belt end passes, and a coöperating eccentric gripping-roller, in combination with a rope or other flexible connection, a guiding-pulley around which said rope passes, and means for connecting one end of said rope to the driving-pulley and the other end of said rope to the adjacent end of the belt, substantially as described.

6. Driving and driven pulleys, a belt, and a coupling connecting the ends of the belt and forming a belt-fastener which unites said ends when the belt is in use, said coupling comprising guides around which the corresponding belt ends pass, means for gripping said belt ends, and means for holding the surplus end portions of the belt, in combination with a rope or other flexible connection, a guiding-pulley around which said rope passes, and means for connecting one end of said rope to the driving-pulley and the other end of said rope to the adjacent end of the belt, substantially as described.

In testimony whereof I affix my signature in presence of two witnesses.

AUSTIN FLEEGER.

Witnesses:
DAVID I. FRANKLIN,
H. G. DUNLAP.